United States Patent
Bernstein

(10) Patent No.: US 9,660,932 B2
(45) Date of Patent: May 23, 2017

(54) SCHEDULING FOR FLOWS IN A POINT-TO-MULTIPOINT COMMUNICATIONS NETWORK

(71) Applicant: CISCO TECHNOLOGY, INC., San Jose, CA (US)

(72) Inventor: Alon Bernstein, Monte Sereno, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/591,607

(22) Filed: Jan. 7, 2015

(65) Prior Publication Data
US 2016/0197846 A1 Jul. 7, 2016

(51) Int. Cl.
*H04B 1/38* (2015.01)
*H04L 12/927* (2013.01)
*H04B 3/00* (2006.01)
*H04L 12/911* (2013.01)

(52) U.S. Cl.
CPC ............ *H04L 47/806* (2013.01); *H04B 3/00* (2013.01); *H04L 47/828* (2013.01)

(58) Field of Classification Search
CPC . H04L 12/2801; H04L 29/06; H04L 12/5695; H04L 2012/6481; H04L 41/0896; H04L 41/509; H04N 21/6168; H04N 21/2385; H04N 21/6118; H04N 7/17309
USPC .......................................... 375/222; 370/468
See application file for complete search history.

(56) References Cited

U.S. PATENT DOCUMENTS

| | | | |
|---|---|---|---|
| 6,341,303 B1 | 1/2002 | Rhee et al. | |
| 6,529,520 B1 | 3/2003 | Lee et al. | |
| 6,956,865 B1* | 10/2005 | Khaunte | H04L 12/2801 370/345 |
| 7,301,988 B2* | 11/2007 | Kanterakis | H04W 52/286 370/394 |
| 7,386,233 B2* | 6/2008 | Dotaro | H04J 14/0227 398/31 |
| 8,134,921 B2 | 3/2012 | Goguen et al. | |
| 8,160,098 B1* | 4/2012 | Yan | H04L 47/522 370/232 |
| 2006/0111129 A1* | 5/2006 | Ihm | H04L 5/0044 455/466 |
| 2008/0095071 A1 | 4/2008 | Lu et al. | |
| 2008/0137597 A1 | 6/2008 | Lu et al. | |
| 2008/0228878 A1 | 9/2008 | Wu et al. | |

(Continued)

*Primary Examiner* — Leila Malek
(74) *Attorney, Agent, or Firm* — Patent Capital Group

(57) ABSTRACT

A method is provided in one example embodiment and includes allocating by a scheduler a transmission opportunity to each of one or more flows listed in a tracking table associated with the a scheduler; and, for each of the one or more flows, sending a bandwidth allocation message to a network element associated with the flow in accordance with a schedule maintained by the scheduler, wherein the bandwidth allocation request is unsolicited by the network element; and determining whether the flow optimized use of the transmission opportunity in accordance with an allocation policy implemented by the scheduler. The method further includes adjusting the schedule in accordance with results of the determining for each of the one or more flows. In certain embodiments, the allocating may comprise allocating an equal transmission opportunity to each of the one or more flows.

20 Claims, 3 Drawing Sheets

(56) References Cited

U.S. PATENT DOCUMENTS

2008/0268855 A1 10/2008 Hanuni et al.
2009/0249417 A1* 10/2009 Goguen .............. H04L 12/2801
                                                                     725/111

* cited by examiner

SCHEDULING FOR FLOWS IN A POINT-TO-MULTIPOINT COMMUNICATIONS NETWORK

TECHNICAL FIELD

This disclosure relates in general to the field of point-to-multipoint ("PMP") communications networks and, more particularly, to scheduling of flows in such networks.

BACKGROUND

Data over Cable Service Interface Specification ("DOCSIS") is an international telecommunications standard that enables implementation of high-speed data transfer over an existing cable TV ("CATV") network. DOCSIS may be employed by cable operators to provide Internet access over their existing hybrid fiber-coaxial ("HFC") infrastructure and may provide a variety of options available at Open Systems Interconnection ("OSI") layers 1 and 2, i.e., the physical layer and data link layer.

DOCSIS has enabled cable operators to widely deploy high-speed data services on CATV systems. Such data services allow subscriber-side devices, such as personal computers and the like, to communicate over an ordinary CATV network. A Cable Modem Termination System ("CMTS") connects the CATV network to a data network, such as the Internet. DOCSIS specifies that cable modems obtain upstream bandwidth according to a request/grant scheme. A cable modem sends a bandwidth allocation request to the CMTS when subscriber devices need to send traffic upstream into the cable network. The CMTS grants these requests using bandwidth allocation MAP messages. As with any system that serves consumers, optimizing speed, latency, processing time, synchronization, etc., presents a significant challenge to system designers, network architects, and engineers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS

Overview

Figure 1:
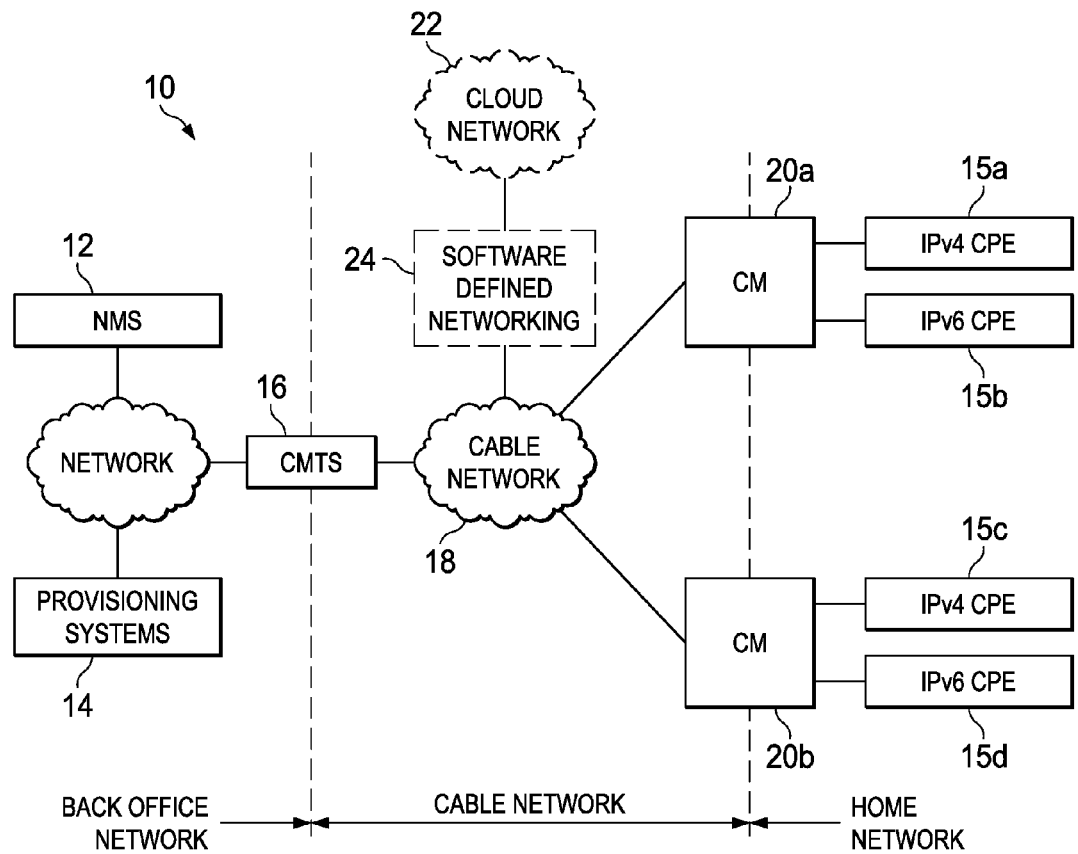
FIG. 1 is a simplified block diagram of an example communication system 10 associated with a cable network infrastructure in accordance with one embodiment of the present disclosure for reducing data transmission latency in such systems.

A method is provided in one example embodiment and includes allocating by a scheduler a transmission opportunity to each of one or more flows listed in a tracking table associated with the a scheduler; and, for each of the one or more flows, sending a bandwidth allocation message to a network element associated with the flow in accordance with a schedule maintained by the scheduler, wherein the bandwidth allocation request is unsolicited by the network element; and determining whether the flow optimized use of the transmission opportunity in accordance with an allocation policy implemented by the scheduler. The method further includes adjusting the schedule in accordance with results of the determining for each of the one or more flows. In certain embodiments, the allocating may comprise allocating an equal transmission opportunity to each of the one or more flows. Additionally, the sending may comprise sending a bandwidth allocation message to a network element in a sequential order as indicated in the tracking table. In some embodiments, the method may further comprise, after the adjusting, for each of the one or more flows, sending a new bandwidth allocation message to the network element associated with the flow in accordance with the adjusted schedule. The bandwidth allocation message may comprise a MAP grant. The scheduler may be incorporated into a Cable Modem Termination System ("CMTS"). Additionally, the network element may comprise a cable modem.

Example Embodiments

In a DOCSIS network, the CMTS controls the timing and rate of all upstream transmissions that cable modems make. Many different kinds of services with different latency, jitter, and throughput requirements run simultaneously on a modern DOCSIS. A conventional DOCSIS-compliant CMTS can provide different upstream scheduling modes for different packet streams or applications through the concept of a "service flow." A service flow represents either an upstream or a downstream flow of data uniquely identified by a service flow ID ("SFID"). Each service flow may have its own quality of service ("QoS") parameters, for example, maximum throughput, minimum guaranteed throughput, and priority. In the case of upstream service flows, a scheduling mode may also be specified.

More than one upstream service flow may exist for each cable modem to accommodate different types of applications. For examples, web-based and email applications may use one service flow, voice-over-IP ("VoIP") applications may use another service flow, and online gaming may use yet another service flow. The characteristics of the service flows will differ based on the type of service required by the respective application. The CMTS and each cable modem are capable of directing the various types of traffic to the appropriate service flow through use of classifiers, which are special filters that match packet properties such as UDP and TCP port numbers to identify the appropriate service flow through which to transport packets.

Service flows are established and activated when a cable modem first comes online. The details of the service flows should be configured in a DOCSIS configuration file used to configure the cable modem; at least one service flow should be configured for the upstream traffic and at least one additional service flow should be configured for the downstream traffic. The first upstream and downstream service flows specified in the DOCSIS configuration file are referred to as the "primary service flows." Service flows may also be dynamically created and activated after a cable modem comes online. This scenario generally applies to a service flow that corresponds to VoIP telephone call data, which is created and activated when a telephone conversation begins and subsequently deactivated and deleted when the call ends.

When a cable modem has data to transmit on behalf of an upstream best effort service flow, the modem cannot simply forward the data onto the DOCSIS network with no delay; rather, the cable modem must request exclusive upstream transmission time from the CMTS. This request process ensures that the data does not collide with the transmissions of another cable modem connected to the same upstream channel. In some situations, the CMTS will schedule certain time periods during which the CMTS allows cable modems to transmit using special messages called "bandwidth requests." A bandwidth request is a very small frame that contains details of the amount of data the cable modem wants to transmit, plus a service identifier ("SID") that corresponds to the upstream service flow that needs to transmit the data. The CMTS maintains an internal table matching SID numbers to upstream service flows.

In alternative (e.g., non-DOCSIS) environments, the scheduler can schedule resources other than time. For example, in S-CDMA, the scheduler may schedule different codes to different cable modems, while in OFRM, the scheduler may schedule different frequencies to different cable modems. Regardless of the specific embodiment or environment, the general function of the scheduler is to allocate a portion of resources to a network element from a pool of shared resources.

In conventional operation, the CMTS schedules bandwidth request opportunities when no other events are scheduled in the upstream. In other words, the scheduler provides bandwidth request opportunities when the upstream scheduler has not planned for a best effort grant, UGS grant, or some other type of grant to be placed at a particular point. Therefore, when an upstream channel is heavily utilized, fewer opportunities exist for cable modems to transmit bandwidth requests. The CMTS may ensure that a small number of bandwidth request opportunities are regularly scheduled, no matter how congested the upstream channel becomes. It is possible that multiple cable modems may transmit bandwidth requests simultaneously, thereby corrupting each other's transmissions. In order to reduce (if not totally eliminate) the potential for collisions that can corrupt bandwidth requests, a "backoff and retry" algorithm is used. In brief, the backoff and retry algorithm requires that a cable modem that decides to transmit a bandwidth request must first wait for a random number of bandwidth request opportunities to pass before the modem makes the transmission. This wait time helps reduce the possibility of collisions that occur due to simultaneous transmissions of bandwidth requests.

When the CMTS receives a bandwidth request from a cable modem, the CMTS may perform the following actions. First, the CMTS uses the SID number received in the bandwidth request to examine the service flow with which the bandwidth request is associated. Next, the CMTS uses a token bucket algorithm to check whether the service flow will exceed the prescribed maximum sustained rate if the CMTS grants the requested bandwidth. The token bucket algorithm may be executed using the equation $Max(T)=T*(R/8)+B$, where T represents time in seconds, $Max(T)$ indicates the maximum number of bytes that can be transmitted on the service flow over time T, R represents the maximum sustained traffic rate for the service flow in bits per second, and B represents the maximum traffic burst for the service flow in bytes. If the CMTS ascertains that the bandwidth request is within throughput limits, the CMTS queues the details of the bandwidth request to an upstream scheduler, which determines when to grant the bandwidth request through use of one or more scheduling algorithms. Finally, the CMTS includes details regarding when the cable modem is able to transmit and for how long the cable modem is able to transmit in the next periodic bandwidth allocation MAP message.

As previously noted, the instructions for when a cable modem may make a transmission come from the CMTS in the form of a bandwidth allocation MAP message. The Cisco CMTS transmits a MAP message every 2 milliseconds to tell the cable modems when they may make a transmission of any kind. Each MAP message contains information that instructs modems exactly when to make a transmission, how long the transmission may last, and what type of data they may transmit.

While the above-described request/grant technique maximizes efficient use of available bandwidth, it also results in significant latency for the upstream data transmissions. In certain situations, such latency may result from the fact that the CMTS is geographically remotely located from the cable modems, such that the time that elapses from when a request message is sent to when a bandwidth allocation MAP message is received is not insignificant. Additionally, as noted above, there may also be restrictions on when request messages can be sent, meaning that there will typically be a delay between when a packet is ready to be sent and the time that the request message can be sent. This latency is especially problematic in the case of time-sensitive applications, such as video games and certain voice calls, for example.

In accordance with features of embodiments described herein, such latency inherent in existing transmission scheduling schemes for PMP systems is significantly reduced through use of a proactive bandwidth allocation technique. In summary, transmission opportunities, in the form of bandwidth allocation MAP messages, will be sent to subscriber nodes whether or not those nodes have requested transmission opportunities. A scheduler monitors the system to determine whether and which nodes are using these transmission opportunities and which are not and then adjusts the bandwidth allocation MAP messages accordingly in an attempt to optimize bandwidth efficiency (in accordance with any one of a number of predefined bandwidth allocation policies), while minimizing latency.

Turning now to FIG. 1, illustrated therein is a simplified block diagram of a communication system 10 associated with a cable network infrastructure in accordance with one embodiment of the present disclosure for reducing data transmission latency in such systems. As shown in FIG. 1, the system 10 includes a network management system ("NMS") 12, a plurality of provisioning systems 14, and a CMTS 16, all of which may be suitably coupled to any type of network 17 (e.g., an Internet, an Intranet, a wireless network, a wide area network ("WAN"), a local area network ("LAN"), etc.). The system 10 of FIG. 1 may also include a cable network 18, which may be coupled to multiple cable modems 20a-20b. Each cable modem can be coupled to various instances of customer premise equipment ("CPE") 15a-15d, which in certain embodiments may be associated with Internet Protocol ("IP") version 4 ("IPv4") or version 6 ("IPv6"). System 10 may also include at least one layer associated with a software defined networking ("SDN") element 24, which may or may not cooperate with a cloud network 26 in accordance with certain embodiments of the present disclosure.

In one example implementation, each of the cable modems 20a, 20b, can connect to the operator's cable network and to a home network, bridging packets between them. Many CPE devices, such as CPEs 15a-15d, can connect to LAN interfaces of the cable modems 20a, 20b. Additionally and/or alternatively, CPE devices can be embedded with the cable modem to form a single, unified device, or they can exist as separate, standalone devices. CPE devices may use IPv4, IPv6, both, or other forms of IP addressing. Examples of typical CPE devices include but are not limited to home routers, set-top devices, personal computers, etc. The CMTS 16 connects the operator's back office and core network with the cable network 18. The primary function of the CMTS 16 is to forward packets between these two domains, and between upstream and downstream channels on the cable network.

Provisioning system 14 may include various applications deployed in the back office network to provide configuration and other support to the devices on the cable network 18. These applications may use IPv4 and/or IPv6, as appropriate to the particular operator's deployment. The applications may include provisioning systems such as:

1) Dynamic Host Configuration Protocol ("DHCP") servers, which provide a cable modem with initial configuration information, including IP address(es), when the cable modem boots;

2) a Config File server, which is used to download configuration files to cable modems when they boot. Configuration files are in binary format and permit the configuration of the cable modems' parameters;

3) a Software Download server, which is used to download software upgrades to cable modems;

4) a Time Protocol server, which provides Time Protocol clients (typically cable modems) with the current time of day; and 5) a Certificate Revocation server, which provides certificate status.

NMS 12 may be implemented as a Simple Network Management Protocol ("SNMP") Manager that enables the cable network to configure and monitor SNMP agents (typically, the cable modems 20a, 20b, and the CMTS 16). NMS 12 may also include a Syslog server that collects messages pertaining to the operation of devices, such as CPE devices 15a-15d. In certain embodiments, DOCSIS is employed to enable transparent bi-directional transfer of IP traffic between a cable system head-end and customer locations, over the cable network 18, which may be implemented as an all-coaxial cable network or as an HFC cable network, for example.

Figure 2:
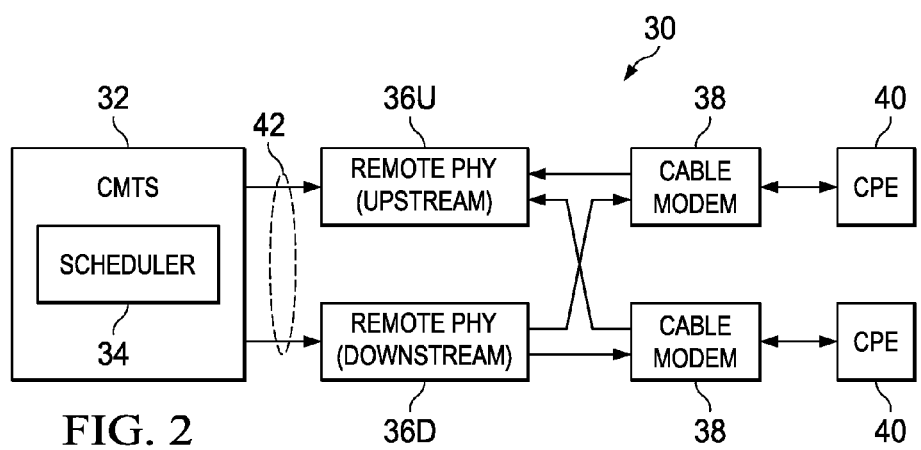
FIG. 2 is another simplified block diagram of an example communication system 10 associated with a cable network infrastructure in accordance with one embodiment of the present disclosure for reducing data transmission latency in such systems.

FIG. 2 is a simplified block diagram of a communication system 30 associated with a cable network infrastructure in accordance with one embodiment of the present disclosure for reducing data transmission latency in such systems. As shown in FIG. 2, a system 30 includes a CMTS 32 including a scheduler 34 for scheduling allocation of upstream bandwidth in accordance with features that will be described hereinbelow. The system 30 further includes an upstream PHY 36U and a downstream PHY 36D, as well as a plurality of cable modems 38 for providing CPE devices 40 access to a cable network 42.

According to an example method that will be explained later in greater detail, the CMTS 32, using scheduler 34, may grant transmission opportunities (via bandwidth allocation MAP messages) to the cable modems 38 proactively and little to no regard to whether any of the cable modems have requested such bandwidth. The processes performed by the scheduler 34 are interoperable with existing network infrastructure, including existing cable modems. Accordingly, cable operators can provide improved upstream latency for customers without installing new hardware at the customer premises, and without modifying existing cable modems.

Figure 3:
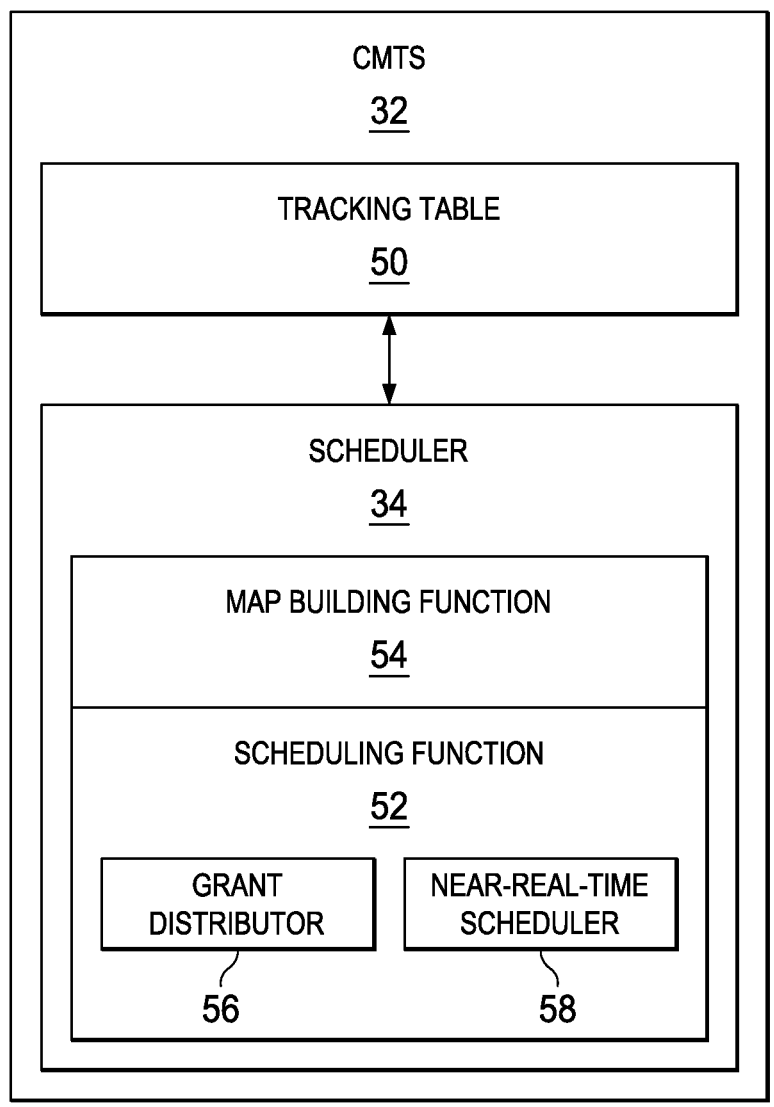
FIG. 3 is a simplified block diagram of a CMTS of FIG. 2 in accordance with one embodiment of the present disclosure for reducing data transmission latency in such systems.

FIG. 3 illustrates one example of how the CMTS 32, and more specifically, scheduler 34 thereof, allocates upstream transmission opportunities in accordance with embodiments described herein. As shown in FIG. 3, the CMTS 32 may include a tracking table 50 in which information regarding active service flows that are eligible to be granted upstream transmission opportunities are listed. As will be described, in accordance with features of embodiments described herein, the service flows listed in the tracking table 50 may be considered in a round-robin fashion to determine whether and what type of transmission opportunity should be granted to the flow at a particular time. In alternative embodiments, methods of startup allocation other than round-robin may be employed without material change to the processes described in greater detail below.

In accordance with features of embodiments described herein, and as shown in FIG. 3, the scheduler 34 may be split into two functions, including a scheduling function 52 and a map building function 54. The scheduling function 52 is further split into two features, including a grant distribution feature, or "grant distributor," 56 and a near-real-time scheduling feature, or an "NRT scheduler" 58. As described in greater detail hereinbelow, the scheduling function 52 performs the task of inspecting the demands of all flows in the system and deciding which flow needs to be service next. The map building function 54 encodes the decision of the scheduling function into a bandwidth allocation MAP message. The specific format of the bandwidth allocation MAP message depends on the physical layer used.

As previously noted, the scheduling function 52 is comprised of two features, including the grant distributor 56, in which role the scheduling function 52 proactively sends unsolicited bandwidth allocation MAP messages to cable modems in a round-robin manner, based on the flows listed in the tracking table 50, and the NRT scheduler 58, in which role the scheduling function 52 adjusts the frequency and/or size of the bandwidth allocation MAP messages sent by the grant distributor 56 is based on monitoring of the system to determine the extent to which the previous transmission opportunities allocated to each of the flows have been utilized by the flow. For example, if the last few transmission opportunities allocated to flow A have gone unutilized, while flow B has utilized each one of the transmission opportunities it was granted during the same period, an adjustment may be made to the allocation scheduling such that flow B is allocated two transmission opportunities for every one transmission opportunity allocated to flow A. If all flows are active at a given time, then the scheduler can use various techniques to assure "fair allocation" of the bandwidth to distribute the bandwidth among the flows. It should be noted that the primary reason for the aforementioned split in features is feature velocity. Specifically, as scheduling features get more sophisticated (for example video quality-based allocation of bandwidth), it may become easier to implement those features in the control plane instead of directly in the scheduler 34. Another benefit of the split in feature functionality is an operating mode that can help reduce the latency of scheduling, as will be described in greater detail below.

In certain embodiments, the map builder 54, grant distributor 56 and NRT scheduler 58 may all be implemented in the same module and may also be implemented using the same process. It will be noted that with typical schedulers, it is fairly difficult to implement a "weighted fair queuing" ("WFQ") scheme, in which different scheduling priorities are assigned to statistically multiplexed data flows, since most scheduling algorithms are performing real-time calculations that approximate WFQ, but in practice, all have corner cases where they do not perform well. In contrast, the NRT scheduler 58 can simply run the formula for weighted fair allocation (generally, the weight of a flow divided by the sum of the weight of all flows) and be accurate by definition.

In certain embodiments, the grant distributor 56 does not consume bandwidth requests from cable modems; rather, the bandwidth requests are sent to the NRT scheduler 58. In theory, bandwidth requests are not even needed. If the upstream PHY can report how many of the unsolicited grants were used during a previous time period, then it is possible to use that information to adjust the unsolicited grant allocation so that the flow with under-utilized grants receives fewer grants during the next time period. As that flow's utilization rate improves, its allocation can be appropriately adjusted upward. Alternatively, it is also possible to take the actual bandwidth requests into account in determining allocation rate. This may enable more accurate allocation of unsolicited requests.

It will be recognized that, in certain cases, the grant distributed to a cable modem may not fit the size of the packets that the cable modem needs to send. In such cases, a first option is for the cable modem to employ fragmentation to send only partial packets. A second option is for the cable modem to transmit only complete packets, at the risk of wasting some of the allocated bandwidth. Assuming the second option is employed, it would likely be more critical that the actual bandwidth requests from the cable modem be examined and used in adjusting the schedule deployed by the scheduler.

In general the allocation of grants by the near-real-time scheduler is based on "load balancing" the bandwidth between the flows. At a time t=0, the bandwidth allocated to all flows can be can be equal and distributed in a round-robin fashion. As different flows have different demands then grants can be re-allocated. Note that because grants are sent to the CM at all times then latency is not an issue even if the scheduler is far away from the cable modem because the CM does not have to wait for grants. As with any load balancing algorithm there are heuristics involved which try to predict future demand and allocate grants in such a way that utilization is optimized, as may be defined by a bandwidth allocation policy of the scheduler (e.g., maximum use of granted bandwidth); however, at a fundamental level this scheduling mode is a tradeoff of reduced latency at the expense of bandwidth utilization.

Figure 4:
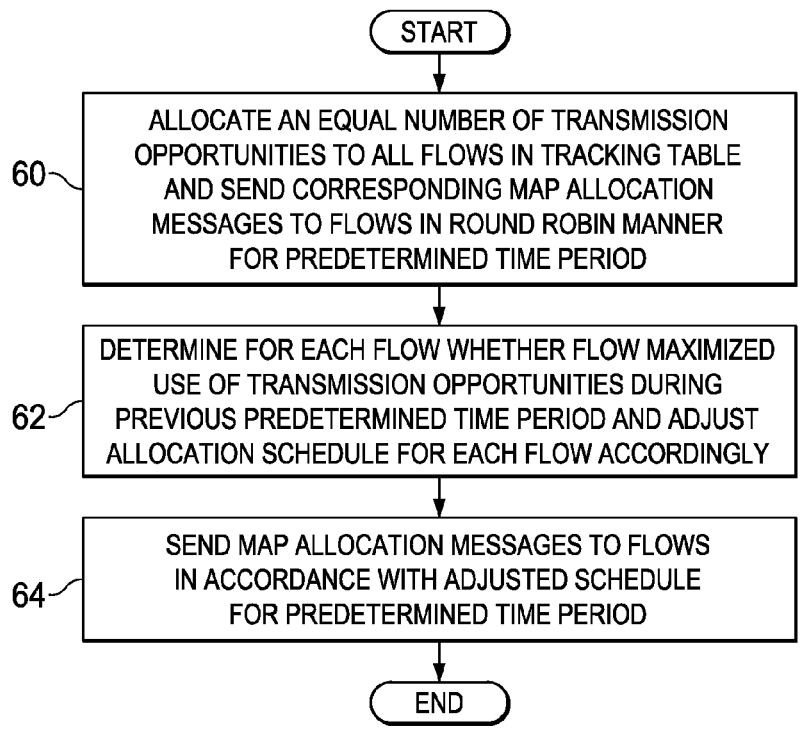
FIG. 4 is a simplified flow diagram illustrating example operational steps that may be associated with the CMTS of FIG. 3 in accordance with one embodiment of the present disclosure for reducing data transmission latency in such systems.

FIG. 4 is a flow diagram illustrating example operational steps that may be associated with system 30 (FIG. 2). In step 60, the number and size of bandwidth allocation MAP messages may be equal, such that each flow listed in the tracking table receives the same bandwidth allocation MAP message, in round robin order. After expiration of a predetermined period of time, in step 62 a determination is made for each of the flows whether that flow should be allocated more or fewer transmission opportunities relative to the other flows. As noted above, in certain embodiments, bandwidth allocation requests on behalf of the flows may be considered in this step. Adjustments are made to the allocation schedule in accordance with the determination. In step 64, transmission opportunities are allocated to the various flows in accordance with the adjusted schedule over the next time period, at the end of which, execution returns to step 62 to facilitate additional adjustments.

For example, assuming 32 flows need to be scheduled, that each MAP message is 2 ms, and that every 1 second (i.e., 500 MAPs), the bandwidth allocation is changed. Assuming further that the rate of the upstream is 100 mbps such that a 2 ms MAP period grants a 100 mbps*0.002 second=200000 bits=25 Kbytes. As a starting condition, 1 Kbyte is allocated for each flow (with fragmentation support this is acceptable for even for 1500 byte and larger packets, as they split over multiple grants). As a result, the first MAP would have grants for flows 1-25, the second MAP would have grants for flows 26-32 and 1-19, the third MAP would have grants for flows 20-32 and 1-13, and so on. It will be noted that in this configuration of grants, the worst case latency for waiting for a grant would be 2.56 ms; however, this is easy to reduce by, for example, granting only 500 bytes per flow. As described above, a determination may be made as to how many of the grants were used for sending data. In the case where all of the grants were used and the "fair allocation" is to allocate the same bandwidth to each flow, bandwidth scheduling can continue as described below. However, it is likely that only subsets of flows are actively sending data. For purposes of simplicity, it will be assumed that only flow 1 is active. In this scenario, one extra slot may be allocated to flow 1 and the amount of the grant to all other (inactive) flows may be reduced slightly. If flow 1 is still "greedy" and consumes less than its subscribed peak rate, then with each recalculation of bandwidth distribution (which as noted above has been set to 1 second), one more grant can be added to flow 1 and the grants for the other (inactive) flows may be reduced even further. Although illustrative examples are provided, it is clear that there are many degrees of freedom in how to allocate bandwidth to flows. The relative ease of implementing these options is a main benefit to the bandwidth application techniques described herein.

It should be noted that, although embodiments herein are described with reference to a cable network, the techniques and methods are equally applicable to any number of other PMP communication systems in which a central base station supports several subscriber systems.

Figure 5:
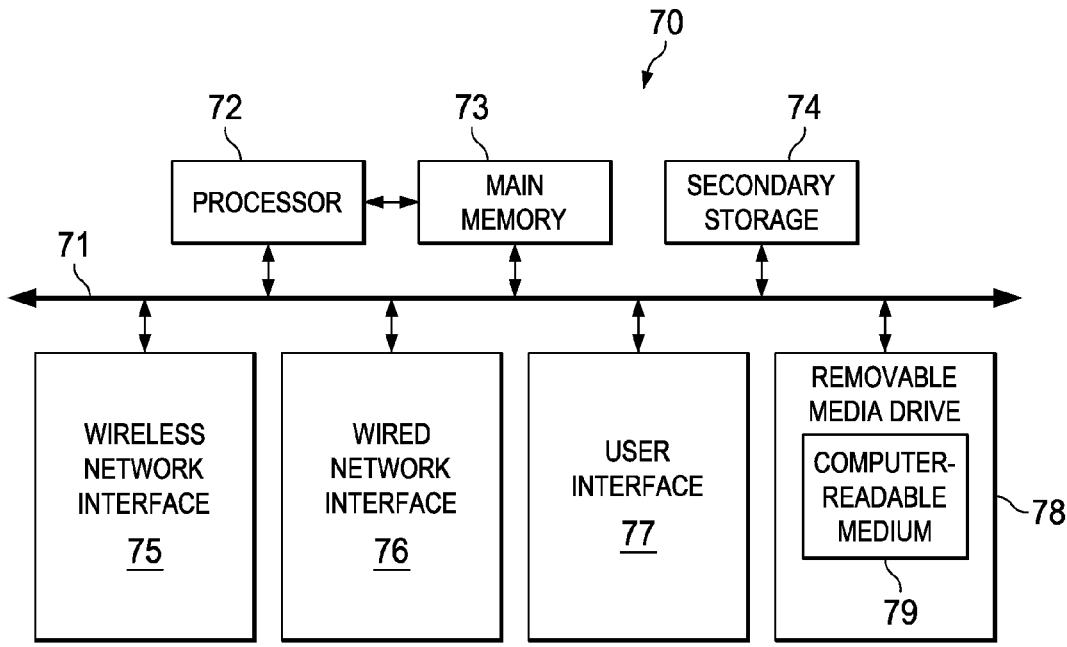
FIG. 5 is a simplified block diagram illustrating components of an example machine capable of executing instructions in a processor, such as a CMTS, in accordance with one embodiment of the present disclosure for reducing data transmission latency in such systems.

Turning to FIG. 5, FIG. 5 illustrates a simplified block diagram of an example machine (or apparatus) 70, which in certain embodiments may comprise a CMTS or any centralized controller in a PMP network in which a scheduling system in accordance with embodiments described herein may be implemented. The example machine 70 corresponds to network elements and computing devices that may be deployed in system 30, including, for example, CMTS 32. In particular, FIG. 5 illustrates a block diagram representation of an example form of a machine within which software and hardware cause machine 70 to perform any one or more of the activities or operations discussed herein. As shown in FIG. 5, machine 70 may include a processor 72, a main memory 73, secondary storage 74, a wireless network interface 75, a wired network interface 76, a user interface 77, and a removable media drive 78 including a computer-readable medium 79. A bus 71, such as a system bus and a memory bus, may provide electronic communication between processor 72 and the memory, drives, interfaces, and other components of machine 70.

Processor 72, which may also be referred to as a central processing unit ("CPU"), can include any general or special-purpose processor capable of executing machine readable instructions and performing operations on data as instructed by the machine readable instructions. Main memory 73 may be directly accessible to processor 72 for accessing machine instructions and may be in the form of random access memory ("RAM") or any type of dynamic storage (e.g., dynamic random access memory ("DRAM")). Secondary storage 74 can be any non-volatile memory such as a hard disk, which is capable of storing electronic data including executable software files. Externally stored electronic data may be provided to computer 70 through one or more removable media drives 78, which may be configured to receive any type of external media such as compact discs ("CDs"), digital video discs ("DVDs"), flash drives, external hard drives, etc.

Wireless and wired network interfaces 75 and 76 can be provided to enable electronic communication between machine 70 and other machines (e.g., PHYs 36U, 36D, cable modems 38) via networks (e.g., cable network 42). In one example, wireless network interface 75 could include a wireless network controller ("WNIC") with suitable transmitting and receiving components, such as transceivers, for wirelessly communicating within a network. Wired network interface 76 can enable machine 70 to physically connect to a network by a wire line such as an Ethernet cable. Both wireless and wired network interfaces 75 and 76 may be configured to facilitate communications using suitable communication protocols such as, for example, Internet Protocol Suite ("TCP/IP"). Machine 70 is shown with both wireless and wired network interfaces 75 and 76 for illustrative purposes only. While one or more wireless and hardwire interfaces may be provided in machine 70, or externally connected to machine 70, only one connection option is needed to enable connection of machine 70 to a network.

A user interface 77 may be provided in some machines to allow a user to interact with the machine 70. User interface 77 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 78 represents a drive configured to receive any type of external computer-readable media (e.g., computer-readable medium 79). Instructions embodying the activities or functions described herein may be stored on one or more external computer-readable media. Additionally, such instructions may also, or alternatively, reside at least partially within a memory element (e.g., in main memory 73 or cache memory of processor 72) of machine 70 during execution, or within a non-volatile memory element (e.g., secondary storage 74) of machine 70. Accordingly, other memory elements of machine 70 also constitute computer-readable media. Thus, "computer-readable medium" is meant to include any medium that is capable of storing instructions for execution by machine 70 that cause the machine to perform any one or more of the activities disclosed herein.

Not shown in FIG. 5 is additional hardware that may be suitably coupled to processor 72 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc.

Machine 70 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 70 to appropriately manage the operation of the hardware components therein.

The elements, shown and/or described with reference to machine 70, are intended for illustrative purposes and are not meant to imply architectural limitations of machines such as those utilized in accordance with the present disclosure. In addition, each machine CMTS 32 may include more or fewer components where appropriate and based on particular needs. As used herein in this Specification, the term "machine" is meant to encompass any computing device or network element such as modems, servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities related to the system for enabling unconfigured devices to securely join an autonomic network, outlined herein may be implemented in software in, for example, CMTS 32. In some embodiments, this software could be received or downloaded from a web server, provided on computer-readable media, or configured by a manufacturer of a particular element in order to provide this system for implementing autonomic LISP for enabling a secure hybrid cloud extension in accordance with features of embodiments described herein. In some embodiments, one or more of these features may be implemented in hardware, provided external to these elements, or consolidated in any appropriate manner to achieve the intended functionality.

In one example implementation, CMTS 32, as well as cable modems 38, are network elements or computing devices, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments of the system for enabling unconfigured devices to securely join an autonomic network, described and shown herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 73, secondary storage 74, computer-readable medium 79) can store data used for the automatic configuration and registration operations described herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 72) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of system 30 may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment 10 could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that the system for automatically configuring and registering an unconfigured device in an autonomic network, as shown in the FIGURES, and its teachings are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. In addition, references in the Specification to "one embodiment", "example embodiment", "an embodiment", "another embodiment", "some embodiments", "various embodiments", "other embodiments", "alternative embodiment", etc. are intended to mean that any features (e.g., elements, structures, modules, components, steps, operations, characteristics, etc.) associated with such embodiments are included in one or more embodiments of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    allocating by a scheduler a transmission opportunity to each of one or more flows listed in a tracking table associated with the scheduler;
    for each of the one or more flows:
        sending a bandwidth allocation MAP message to a network element associated with the flow in accordance with a schedule maintained by the scheduler, wherein the bandwidth allocation MAP message is unsolicited by the network element and grants to the network element the transmission opportunity allocated by the scheduler; and
        determining whether the flow optimized use of the transmission opportunity in accordance with an allocation policy implemented by the scheduler; and adjusting the schedule in accordance with results of the determining for each of the one or more flows;

wherein the bandwidth allocation MAP message includes information regarding the transmission opportunity, the information comprising timing of the transmission opportunity, length of the transmission opportunity, and a type of data that may be transmitted during the transmission opportunity.

2. The method of claim 1, wherein the allocating comprises allocating an equal transmission opportunity to each of the one or more flows.

3. The method of claim 1, wherein the sending comprises sending a bandwidth allocation MAP message to a network element in a sequential order as indicated in the tracking table.

4. The method of claim 1 further comprising, after the adjusting, for each of the one or more flows, sending a new bandwidth allocation MAP message to the network element associated with the flow in accordance with the adjusted schedule.

5. The method of claim 1, wherein the bandwidth allocation MAP message comprises a MAP grant.

6. The method of claim 1, wherein the scheduler is incorporated into a Cable Modem Termination System ("CMTS").

7. The method of claim 1, wherein the network element comprises a cable modem.

8. Non-transitory tangible media that includes code for execution and when executed by a processor is operable to perform operations comprising:

allocating by a scheduler a transmission opportunity to each of one or more flows listed in a tracking table associated with the scheduler;

for each of the one or more flows:

sending a bandwidth allocation MAP message to a network element associated with the flow in accordance with a schedule maintained by the scheduler, wherein the bandwidth allocation MAP message is unsolicited by the network element and grants to the network element the transmission opportunity allocated by the scheduler; and determining whether the flow optimized use of the transmission opportunity in accordance with an allocation policy implemented by the scheduler; and adjusting the schedule in accordance with results of the determining for each of the one or more flows;

wherein the bandwidth allocation MAP message includes information regarding the transmission opportunity, the information comprising timing of the transmission opportunity, length of the transmission opportunity, and a type of data that may be transmitted during the transmission opportunity.

9. The media of claim 8, wherein the allocating comprises allocating an equal transmission opportunity to each of the one or more flows.

10. The media of claim 8, wherein the sending comprises sending a bandwidth allocation MAP message to a network element in a sequential order as indicated in the tracking table.

11. The media of claim 8 further comprising, after the adjusting, for each of the one or more flows, sending a new bandwidth allocation MAP message to the network element associated with the flow in accordance with the adjusted schedule.

12. The media of claim 8, wherein the bandwidth allocation MAP message comprises a MAP grant.

13. The media of claim 8, wherein the scheduler is incorporated into a Cable Modem Termination System ("CMTS").

14. The media of claim 8, wherein the network element comprises a cable modem.

15. An apparatus comprising:

a memory element configured to store data; and a processor operable to execute instructions associated with the data;

wherein the apparatus is configured to:

allocate using a scheduler a transmission opportunity to each of one or more flows listed in a tracking table associated with the scheduler;

for each of the one or more flows:

send a bandwidth allocation MAP message to a network element associated with the flow in accordance with a schedule maintained by the scheduler, wherein the bandwidth allocation MAP message is unsolicited by the network element and grants to the network element the transmission opportunity allocated by the scheduler; and determine whether the flow optimized use of the transmission opportunity in accordance with an allocation policy implemented by the scheduler; and adjust the schedule in accordance with results of the determining for each of the one or more flows;

wherein the bandwidth allocation MAP message includes information regarding the transmission opportunity, the information comprising timing of the transmission opportunity, length of the transmission opportunity, and a type of data that may be transmitted during the transmission opportunity.

16. The apparatus of claim 15, wherein the allocating comprises allocating an equal transmission opportunity to each of the one or more flows.

17. The apparatus of claim 15, wherein the sending comprises sending a bandwidth allocation MAP message to a network element in a sequential order as indicated in the tracking table.

18. The apparatus of claim 15 further comprising, after the adjusting, for each of the one or more flows, sending a new bandwidth allocation MAP message to the network element associated with the flow in accordance with the adjusted schedule.

19. The apparatus of claim 15, wherein the bandwidth allocation MAP message comprises a MAP grant.

20. The apparatus of claim 15, wherein the network element comprises a cable modem.

* * * * *